US012712878B2

(12) United States Patent
Mihajlovic et al.

(10) Patent No.: US 12,712,878 B2
(45) Date of Patent: Aug. 18, 2026

(54) POLICY BASED AUTHENTICATION FOR PRIVILEGED REMOTE ACCESS (PRA) SYSTEMS

(71) Applicant: Zscaler, Inc., San Jose, CA (US)

(72) Inventors: Dejan Mihajlovic, Santa Cruz, CA (US); Deepika Dwivedi, San Carlos, CA (US); Anurag Raghuvanshi, Bengaluru (IN); Rakesh Adepu, Hyderabad (IN); Mithun A S, Bengaluru (IN); Sandip Davara, San Jose, CA (US); Abhijeet Malik, San Jose, CA (US); Kanti Varanasi, Sunnyvale, CA (US); William Fehring, Sunnyvale, CA (US); John A. Chanak, Saratoga, CA (US); Sunil Menon, Los Gatos, CA (US)

(73) Assignee: Zscaler, Inc., San Jose, CA (US)

( * ) Notice: Subject to any disclaimer, the term of this patent is extended or adjusted under 35 U.S.C. 154(b) by 264 days.

(21) Appl. No.: 18/312,263

(22) Filed: May 4, 2023

(65) Prior Publication Data

US 2024/0323189 A1 Sep. 26, 2024

(30) Foreign Application Priority Data

Mar. 22, 2023 (IN) ............................ 202311020105

(51) Int. Cl.
*H04L 9/40* (2022.01)

(52) U.S. Cl.
CPC .......... *H04L 63/10* (2013.01); *H04L 63/0435* (2013.01); *H04L 63/20* (2013.01)

(58) Field of Classification Search
CPC ...... H04L 63/10; H04L 63/0435; H04L 63/20
See application file for complete search history.

(56) References Cited

U.S. PATENT DOCUMENTS

| | | | |
|---|---|---|---|
| 9,460,274 B1 | 10/2016 | Varanasi et al. | |
| 10,375,024 B2 | 8/2019 | Foxhoven et al. | |
| 10,616,180 B2 | 4/2020 | Chanak et al. | |
| 11,356,448 B1 | 6/2022 | Varanasi et al. | |
| 2010/0107225 A1* | 4/2010 | Spencer | H04W 12/069 726/4 |
| 2013/0167196 A1* | 6/2013 | Spencer | H04L 67/303 370/254 |
| 2017/0177808 A1* | 6/2017 | Irwin | G16H 40/63 |
| 2017/0310709 A1 | 10/2017 | Foxhoven et al. | |
| 2018/0270201 A1* | 9/2018 | Chanak | H04L 63/0876 |
| 2020/0162890 A1* | 5/2020 | Spencer | H04L 43/10 |
| 2020/0358624 A1* | 11/2020 | Schnabel | H04L 9/50 |

(Continued)

*Primary Examiner* — Luu T Pham
*Assistant Examiner* — Paul J Skwierawski
(74) *Attorney, Agent, or Firm* — Baratta Law PLLC; Lawrence A. Baratta, Jr.; Ryan Odessa

(57) ABSTRACT

Systems and methods for policy based seamless authentication for PRA systems through zero trust private networks. The various systems and methods described herein include steps of receiving a request to access a Privileged Remote Access (PRA) system; determining if any credential rules apply to a console associated with the request; retrieving credentials associated with any of a user and the console from a database, thereby avoiding the user being required to provide credentials; and providing access to the requested PRA system based on the retrieved credentials.

15 Claims, 15 Drawing Sheets

(56) References Cited

U.S. PATENT DOCUMENTS

| | | | |
|---|---|---|---|
| 2020/0358827 | A1 | 11/2020 | Foxhoven et al. |
| 2021/0136041 | A1 | 5/2021 | Foxhoven et al. |
| 2021/0250333 | A1 | 8/2021 | Negrea et al. |
| 2021/0314301 | A1 | 10/2021 | Chanak et al. |
| 2021/0336932 | A1 | 10/2021 | Chanak et al. |
| 2021/0336933 | A1 | 10/2021 | Shah et al. |
| 2021/0336934 | A1 | 10/2021 | Deshmukh et al. |
| 2021/0336959 | A1 | 10/2021 | Shah et al. |
| 2021/0377222 | A1 | 12/2021 | Sharma et al. |
| 2021/0377223 | A1 | 12/2021 | Chanak et al. |
| 2022/0029965 | A1 | 1/2022 | Chanak et al. |
| 2022/0311777 | A1* | 9/2022 | Makenzi ............. H04L 63/0263 |
| 2022/0353244 | A1 | 11/2022 | Kahn et al. |
| 2023/0019448 | A1 | 1/2023 | Deshmukh et al. |

* cited by examiner

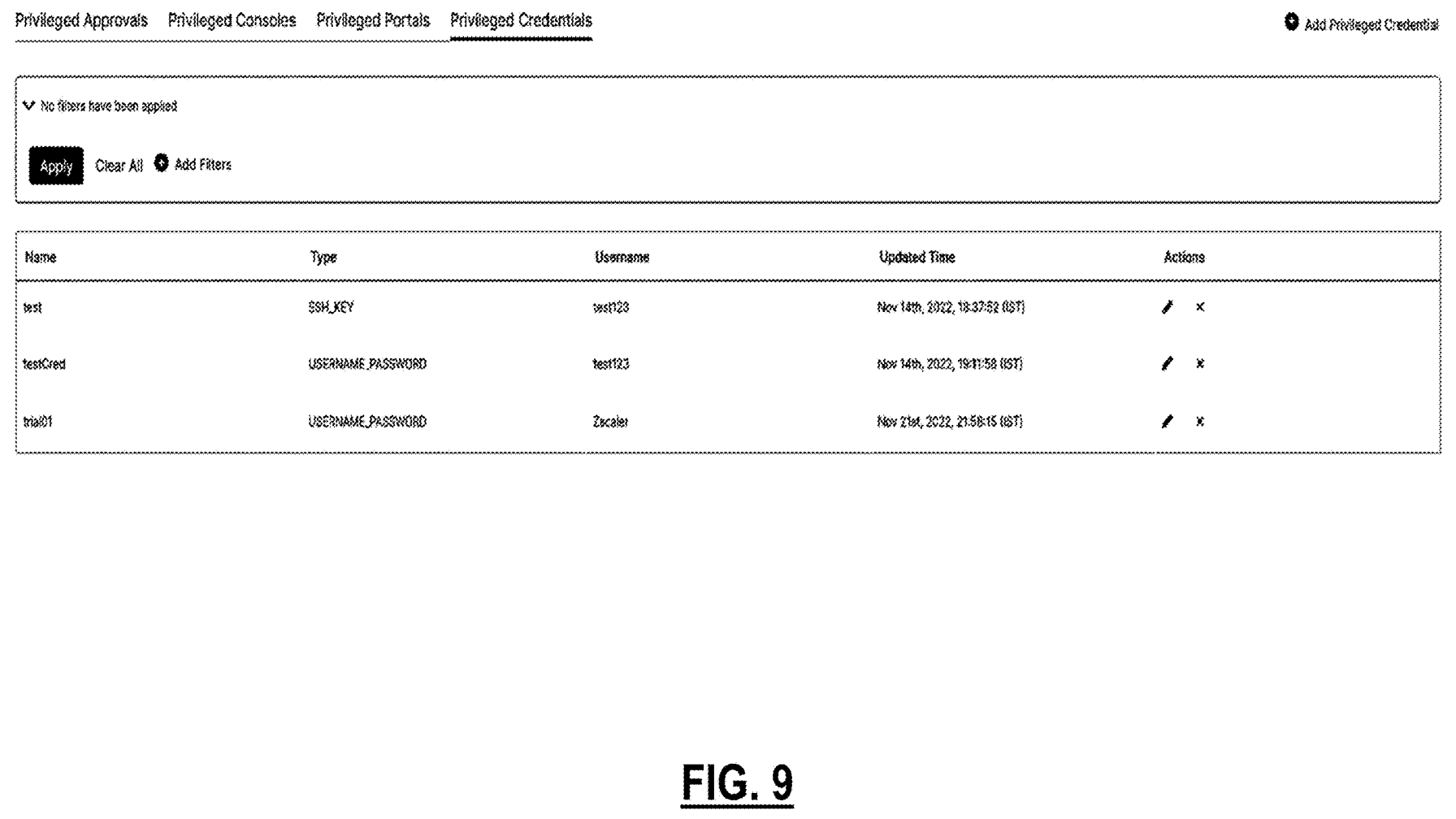

Privileged Approvals Privileged Consoles Privileged Portals Privileged Credentials Add Privileged Credential No filters have been applied Apply Clear All Add Filters

| Name | Type | Username | Updated Time | Actions |
|---|---|---|---|---|
| test | SSH_KEY | test123 | Nov 14th, 2022, 18:37:52 (IST) | |
| testCred | USERNAME_PASSWORD | test123 | Nov 14th, 2022, 19:41:58 (IST) | |
| trial01 | USERNAME_PASSWORD | Zscaler | Nov 21st, 2022, 21:58:15 (IST) | |

FIG. 9

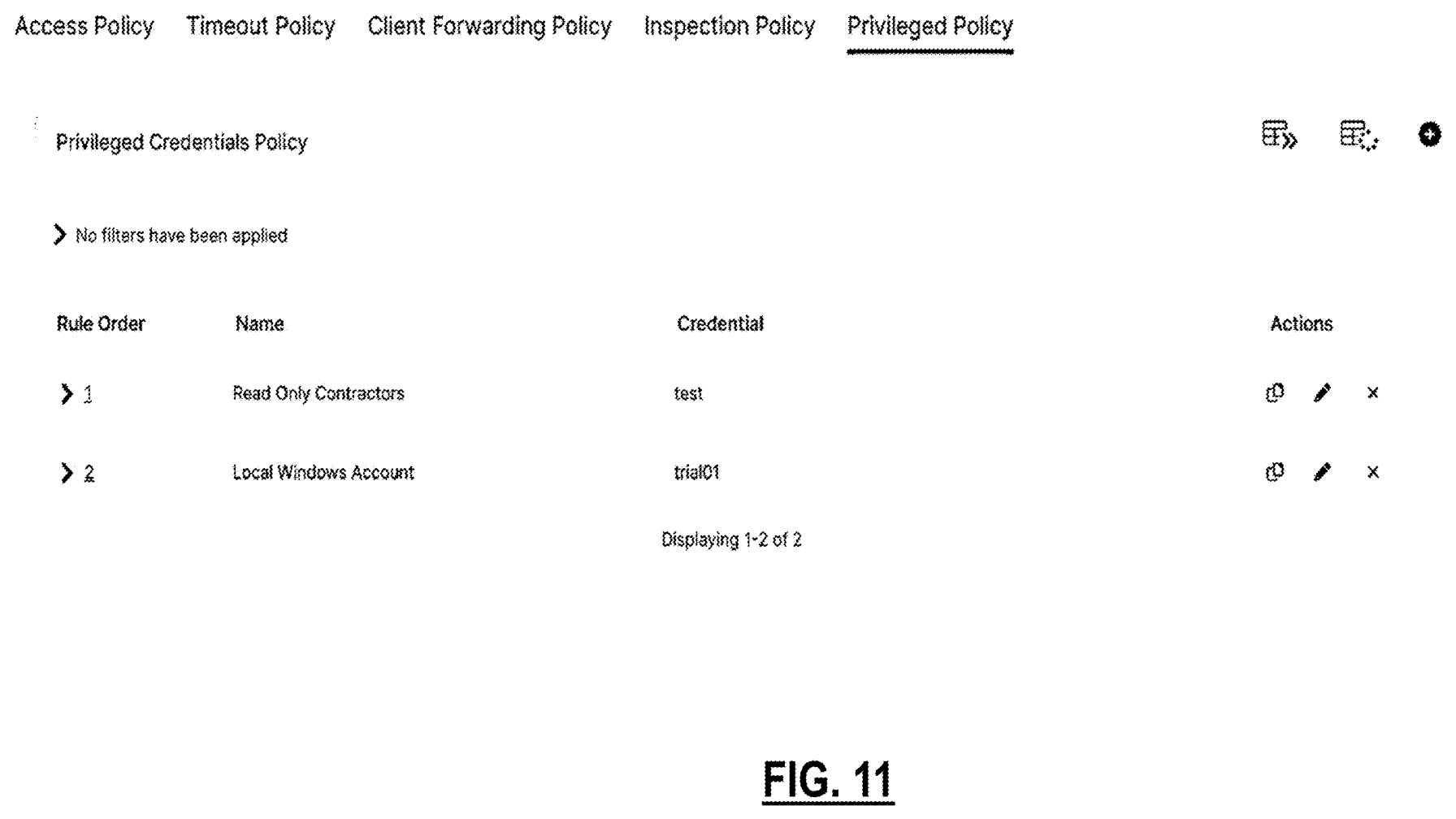

Access Policy Timeout Policy Client Forwarding Policy Inspection Policy Privileged Policy Privileged Credentials Policy No filters have been applied

| Rule Order | Name | Credential | Actions |
| --- | --- | --- | --- |
| 1 | Read Only Contractors | test | |
| 2 | Local Windows Account | trial01 | |

Displaying 1-2 of 2

FIG. 11

POLICY BASED AUTHENTICATION FOR PRIVILEGED REMOTE ACCESS (PRA) SYSTEMS

FIELD OF THE DISCLOSURE

The present disclosure relates generally to networking and computing. More particularly, the present disclosure relates to systems and methods for policy based seamless authentication for PRA systems through zero trust private networks.

BACKGROUND OF THE DISCLOSURE

Existing single sign-on solutions which target Privileged Remote Access (PRA) systems typically require user credentials to be stored in one or more third party authentication systems. These third party authentication systems do not typically follow zero trust methodology and practice. Further, traditional solutions require the target PRA system to support these external authentication methods. These methods put user credentials, such as secret materials and methods used to authenticate into PRA systems, at risk. The proposed systems and methods for policy based seamless authentication for PRA systems through zero trust private networks solve these problems, while making the authentication process fully compliant with zero trust architectures.

BRIEF SUMMARY OF THE DISCLOSURE

In an embodiment, the present disclosure includes a method with steps, a cloud-based system configured to implement the steps, and a non-transitory computer-readable medium storing computer-executable instructions for causing performance of the steps. The steps include receiving a request to access a Privileged Remote Access (PRA) system; determining if any credential rules apply to a console associated with the request; retrieving credentials associated with any of a user and the console from a database, thereby avoiding the user being required to provide credentials; and providing access to the requested PRA system based on the retrieved credentials.

The steps can further include wherein the credentials are retrieved based on matching credentials with the request, wherein preconfigured policy is utilized for matching an identity of the user issuing the request to a stored credential. The database can include credentials stored in an encrypted form, wherein the steps can further include decrypting the credentials after the retrieving. The decrypting can be performed through one or more crypto services. Decrypted credentials are stored in memory for a finite amount of time. Credentials can be retrieved based on a plurality of criteria including any of Security Assertion Markup Language (SAML) attributes, client posture, and end user network. Responsive to no credentials being found, the steps can further include providing an interactive credential retrieving window; and instructing the user to provide credentials via the interactive credential retrieving window.

BRIEF DESCRIPTION OF THE DRAWINGS

The present disclosure is illustrated and described herein with reference to the various drawings, in which like reference numbers are used to denote like system components/method steps, as appropriate, and in which:

FIG. 4 is a block diagram of a user device, which may be used with the cloud-based system or the like.

FIG. 9 is a screenshot of a User Interface (UI) for configuring privileged credentials.

FIG. 11 is a screenshot of a window for configuring privileged credential policy.

DETAILED DESCRIPTION OF THE DISCLOSURE

Again, the present disclosure relates to systems and methods for policy based seamless authentication for PRA systems through zero trust private networks. Various embodiments are adapted to automatically select the most optimal authentication method and credentials through the use of zero trust policies. Protected credentials are matched with requests through various methods in order to determine the identity of a user initiating the request. By automatically determining credentials, systems can seamlessly provide authentication to PRA systems without any action being required by the end user.

Cloud-based security solutions have emerged, such as Zscaler Internet Access (ZIA) and Zscaler Private Access (ZPA), available from Zscaler, Inc., the applicant and assignee of the present application. ZPA is a cloud service that provides seamless, zero trust access to private applications running on the public cloud, within the data center, within an enterprise network, etc. As described herein, ZPA is referred to as zero trust access to private applications or simply a zero trust access service. Here, applications are never exposed to the Internet, making them completely invisible to unauthorized users. The service enables the applications to connect to users via inside-out connectivity versus extending the network to them. Users are never placed on the network. This Zero Trust Network Access (ZTNA) approach supports both managed and unmanaged devices and any private application (not just web apps).

Example Cloud-Based System Architecture

Figure 1A:
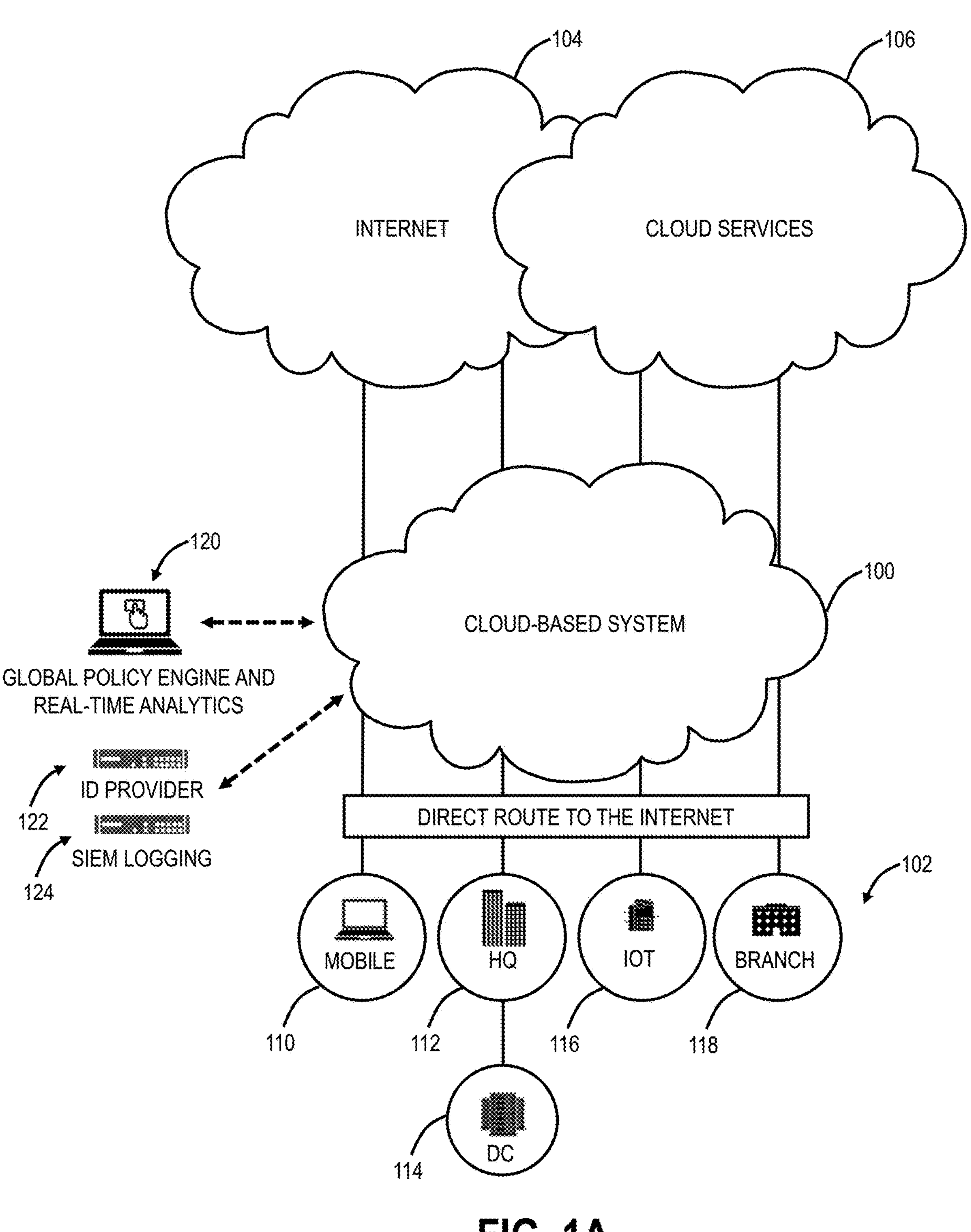
FIG. 1A is a network diagram of a cloud-based system offering security as a service.

FIG. 1A is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, antimalware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

Figure 5:
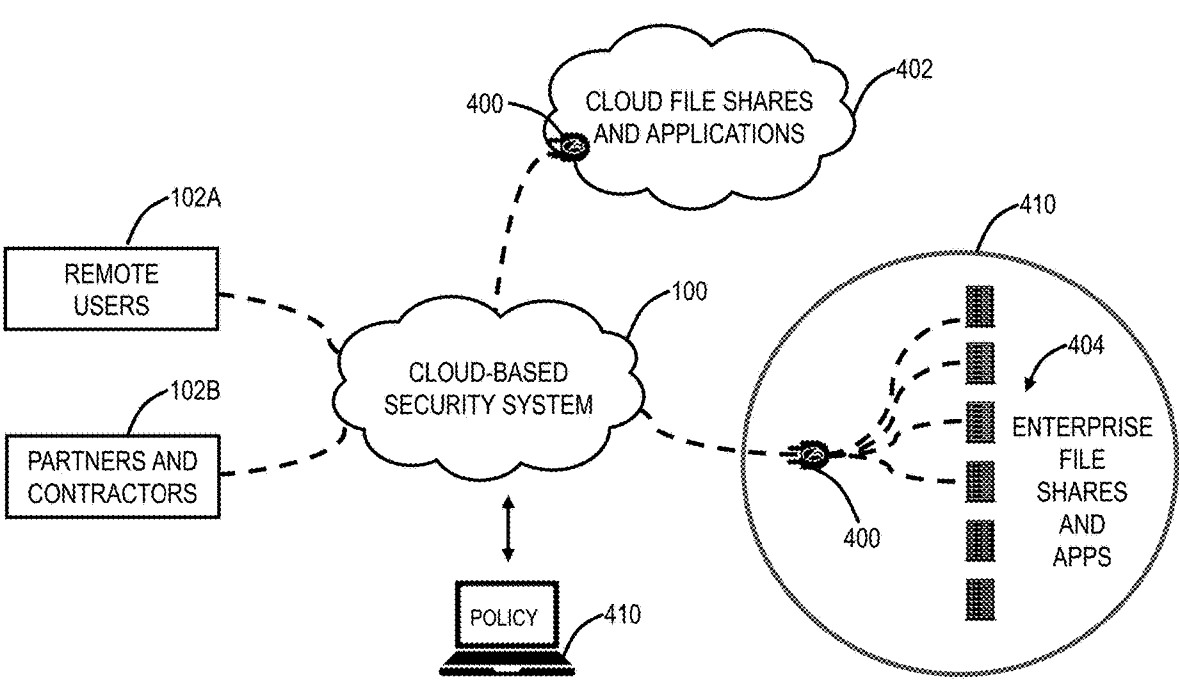
FIG. 5 is a network diagram of a Zero Trust Network Access (ZTNA) application utilizing the cloud-based system.

For illustration purposes, the users 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more user devices (an example user device 300 is illustrated in FIG. 5). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy, rule, configuration, etc. changes-they are instantly remediated across the entire cloud-based system 100. As well, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc.

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as Generic Routing Encapsulation (GRE), Layer Two Tunneling Protocol (L2TP), Internet Protocol (IP) Security (IPsec), customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Zero Trust

Figure 1B:
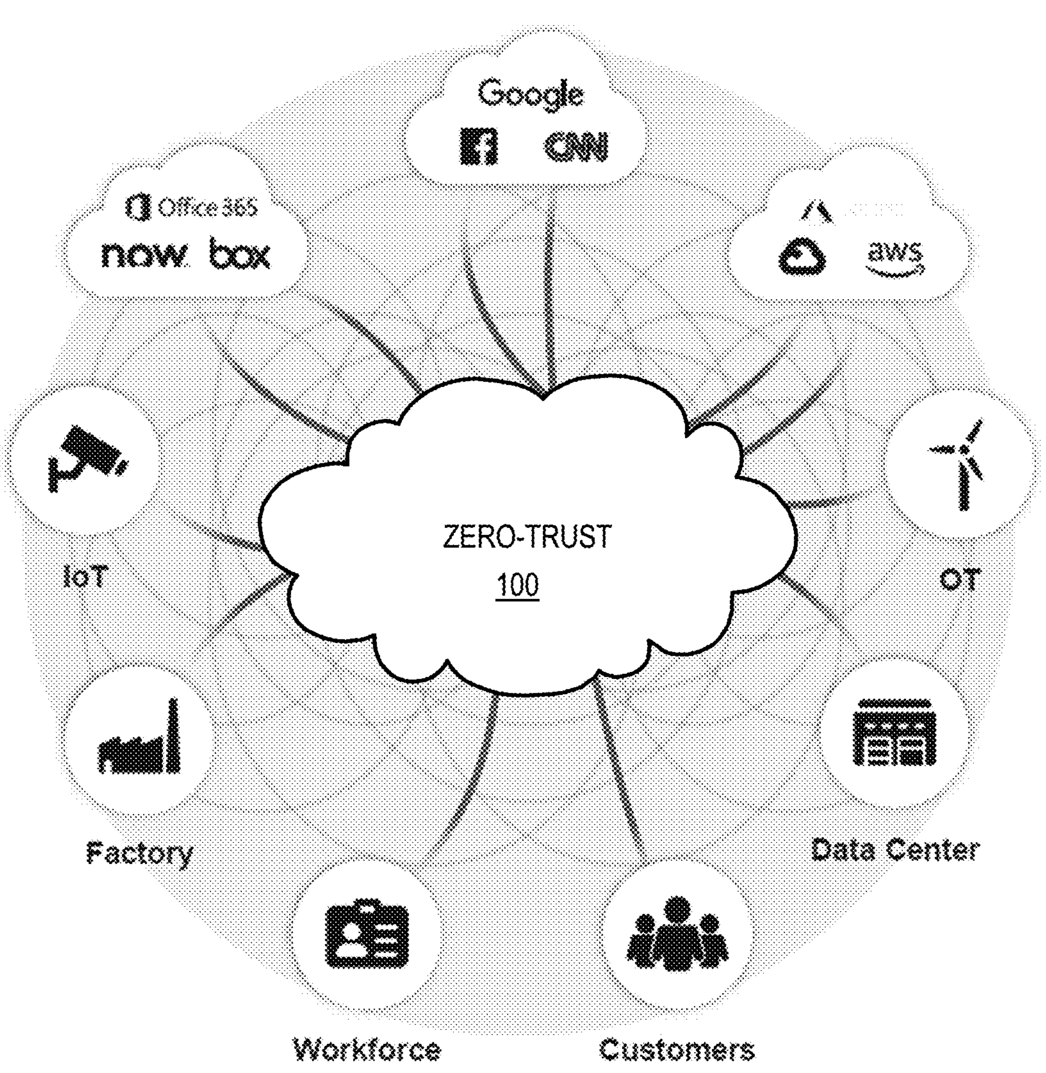
FIG. 1B is a logical diagram of the cloud-based system operating as a zero-trust platform.

FIG. 1B is a logical diagram of the cloud-based system 100 operating as a zero-trust platform. Zero trust is a framework for securing organizations in the cloud and mobile world that asserts that no user or application should be trusted by default. Following a key zero trust principle, least-privileged access, trust is established based on context (e.g., user identity and location, the security posture of the endpoint, the app or service being requested) with policy checks at each step, via the cloud-based system 100. Zero trust is a cybersecurity strategy wherein security policy is applied based on context established through least-privileged access controls and strict user authentication-not assumed trust. A well-tuned zero trust architecture leads to simpler network infrastructure, a better user experience, and improved cyberthreat defense.

Establishing a zero trust architecture requires visibility and control over the environment's users and traffic, including that which is encrypted; monitoring and verification of traffic between parts of the environment; and strong multi-factor authentication (MFA) methods beyond passwords, such as biometrics or one-time codes. This is performed via the cloud-based system 100. Critically, in a zero trust architecture, a resource's network location is not the biggest factor in its security posture anymore. Instead of rigid network segmentation, your data, workflows, services, and such are protected by software-defined microsegmentation, enabling you to keep them secure anywhere, whether in your data center or in distributed hybrid and multicloud environments.

The core concept of zero trust is simple: assume everything is hostile by default. It is a major departure from the network security model built on the centralized data center and secure network perimeter. These network architectures rely on approved IP addresses, ports, and protocols to establish access controls and validate what's trusted inside the network, generally including anybody connecting via remote access VPN. In contrast, a zero trust approach treats all traffic, even if it is already inside the perimeter, as hostile. For example, workloads are blocked from communicating until they are validated by a set of attributes, such as a fingerprint or identity. Identity-based validation policies result in stronger security that travels with the workload wherever it communicates—in a public cloud, a hybrid environment, a container, or an on-premises network architecture.

Because protection is environment-agnostic, zero trust secures applications and services even if they communicate across network environments, requiring no architectural changes or policy updates. Zero trust securely connects users, devices, and applications using business policies over any network, enabling safe digital transformation. Zero trust is about more than user identity, segmentation, and secure access. It is a strategy upon which to build a cybersecurity ecosystem.

At its core are three tenets:

Terminate every connection: Technologies like firewalls use a "passthrough" approach, inspecting files as they are delivered. If a malicious file is detected, alerts are often too late. An effective zero trust solution terminates every connection to allow an inline proxy architecture to inspect all traffic, including encrypted traffic, in real time—before it reaches its destination—to prevent ransomware, malware, and more.

Protect data using granular context-based policies: Zero trust policies verify access requests and rights based on context, including user identity, device, location, type of content, and the application being requested. Policies are adaptive, so user access privileges are continually reassessed as context changes.

Reduce risk by eliminating the attack surface: With a zero trust approach, users connect directly to the apps and resources they need, never to networks (see ZTNA). Direct user-to-app and app-to-app connections eliminate the risk of lateral movement and prevent compromised devices from infecting other resources. Plus, users and apps are invisible to the internet, so they cannot be discovered or attacked.

Figure 1C:
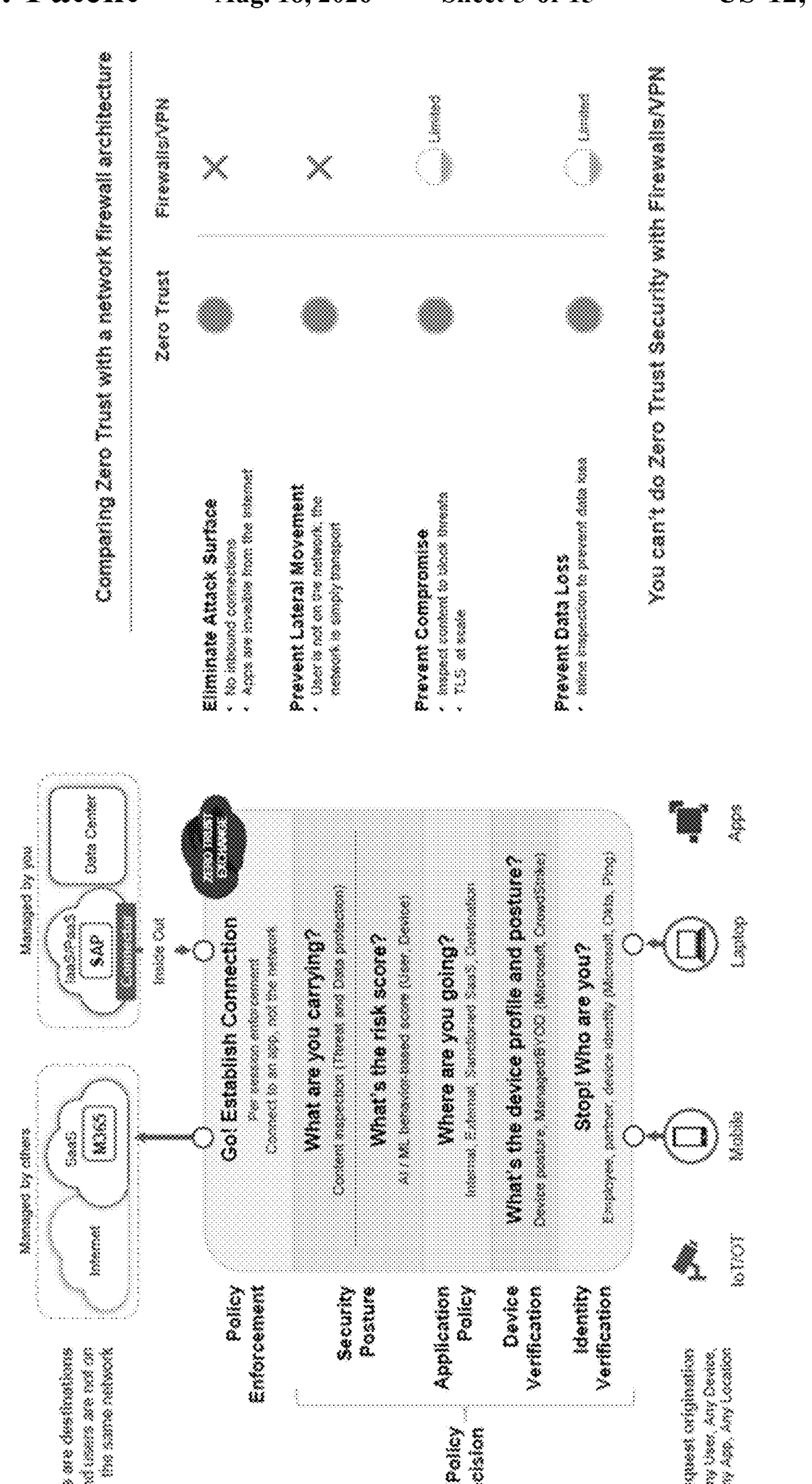
FIG. 1C is a logical diagram illustrating zero trust policies with the cloud-based system and a comparison with the conventional firewall-based approach.

FIG. 1C is a logical diagram illustrating zero trust policies with the cloud-based system 100 and a comparison with the conventional firewall-based approach. Zero trust with the cloud-based system 100 allows per session policy decisions and enforcement regardless of the user 102 location. Unlike the conventional firewall-based approach, this eliminates attack surfaces, there are no inbound connections; prevents lateral movement, the user is not on the network; prevents compromise, allowing encrypted inspection; and prevents data loss with inline inspection.

Example Implementation of the Cloud-Based System

Figure 2:
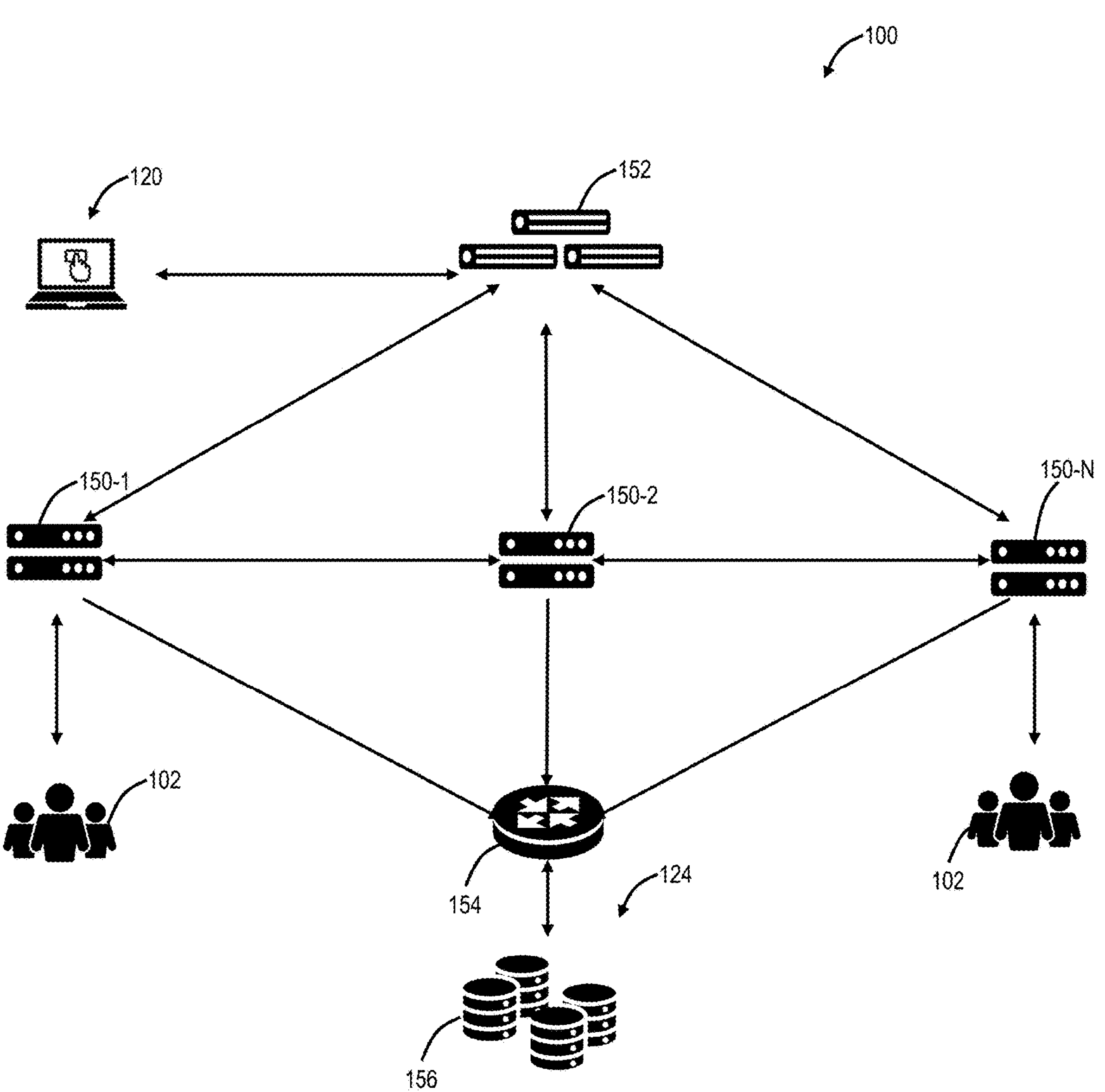
FIG. 2 is a network diagram of an example implementation of the cloud-based system.
Figure 4:
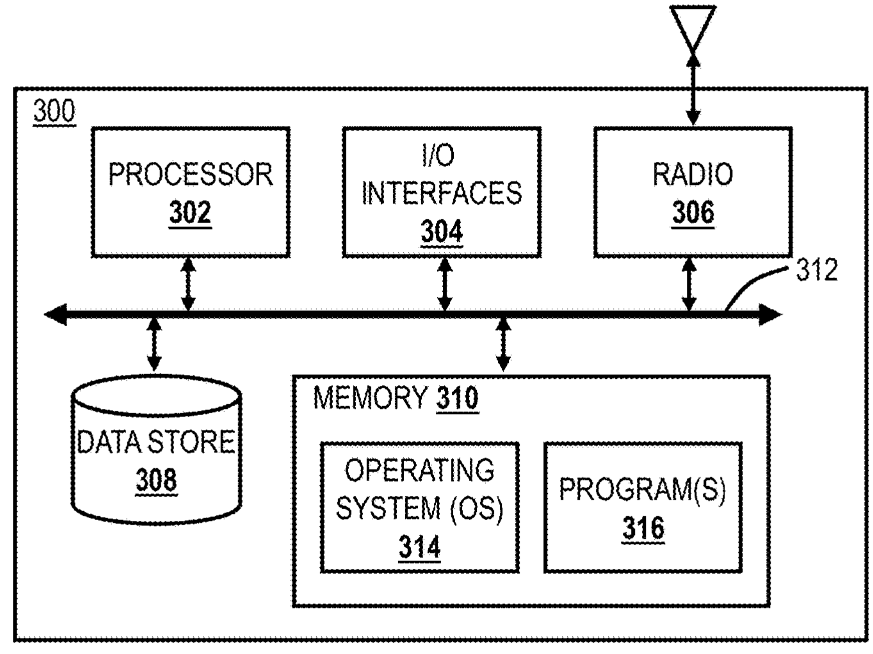

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the enforcement nodes 150. The central authority 152 provide centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150.

Of note, the cloud-based system 100 is an external system meaning it is separate from tenant's private networks (enterprise networks) as well as from networks associated with the devices 110, 116, and locations 112, 118. Also, of note, the present disclosure describes a private enforcement node 150P that is both part of the cloud-based system 100 and part of a private network. Further, of note, the enforcement node described herein may simply be referred to as a node or cloud node. Also, the terminology enforcement node 150 is used in the context of the cloud-based system 100 providing cloud-based security. In the context of secure, private application access, the enforcement node 150 can also be referred to as a service edge or service edge node. Also, a service edge node 150 can be a public service edge node (part of the cloud-based system 100) separate from an enterprise network or a private service edge node (still part of the cloud-based system 100) but hosted either within an enterprise network, in a data center 114, in a branch office 118, etc. Further, the term nodes as used herein with respect to the cloud-based system 100 (including enforcement nodes, service edge nodes, etc.) can be one or more servers, including physical servers, virtual machines (VM) executed on physical hardware, etc., as described above. The service edge node 150 can also be a Secure Access Service Edge (SASE).

The enforcement nodes 150 are full-featured secure internet gateways that provide integrated internet security. They inspect all web traffic bi-directionally for malware and enforce security, compliance, and firewall policies, as described herein, as well as various additional functionality. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the enforcement nodes 150. In another embodiment, specific data specified by each tenant, e.g., only email, only executable files, etc., is processed through one of the enforcement nodes 150.

Each of the enforcement nodes 150 may generate a decision vector D=[d1, d2, . . . , dn] for a content item of one or more parts C=[c1, c2, . . . , cm]. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the enforcement node 150 may allow the distribution of the content item, preclude distribution of the content item, allow distribution of the content item after a cleaning process, or perform threat detection on the content item. In an embodiment, the actions taken by one of the enforcement nodes 150 may be determinative on the threat classification of the content item and on a security policy of the tenant to which the content item is being sent from or from which the content item is being requested by. A content item is violating if, for any part C=[c1, c2, . . . , cm] of the content item, at any of the enforcement nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

The policy can be tenant-specific and can include access privileges for users, websites and/or content that is disallowed, restricted domains, DLP dictionaries, etc. Once downloaded, a tenant's policy is cached until a policy change is made in the management system 120. The policy can be tenant-specific and can include access privileges for users, websites and/or content that is disallowed, restricted domains, DLP dictionaries, etc. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QOS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

Example Server Architecture

Figure 3:
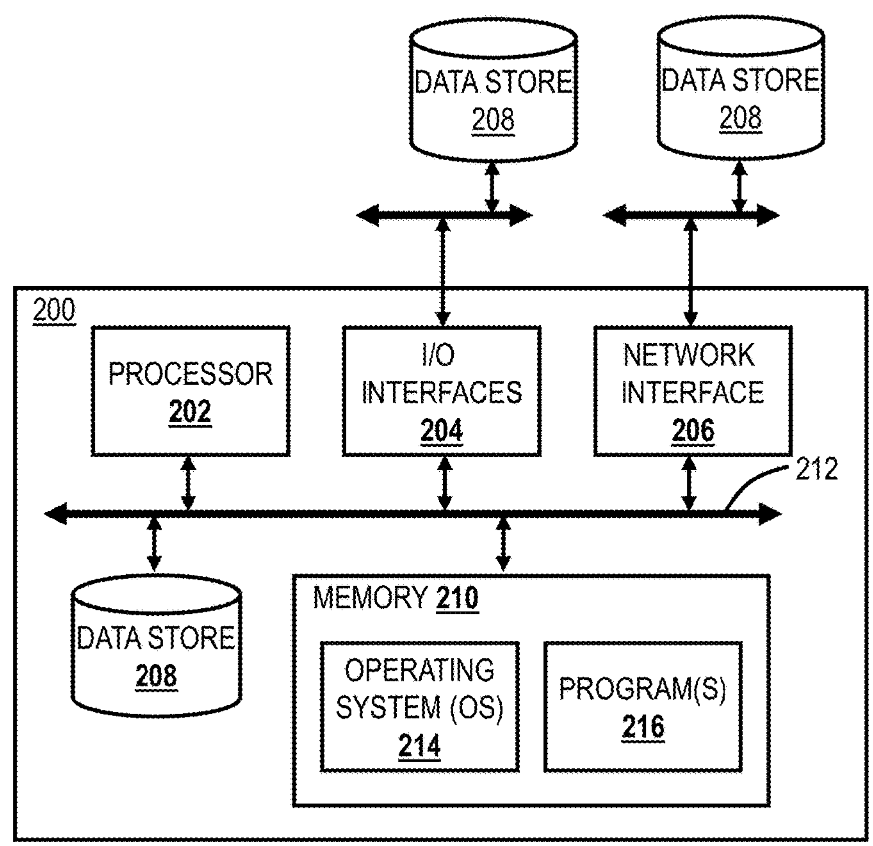
FIG. 3 is a block diagram of a server, which may be used in the cloud-based system, in other systems, or standalone.

FIG. 3 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 3 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

FIG. 4 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 4 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

Zero Trust Network Access Using the Cloud-Based System

FIG. 5 is a network diagram of a Zero Trust Network Access (ZTNA) application utilizing the cloud-based system 100. For ZTNA, the cloud-based system 100 can dynamically create a connection through a secure tunnel between an endpoint (e.g., users 102A, 102B) that are remote and an on-premises connector 400 that is either located in cloud file shares and applications 402 and/or in an enterprise network 410 that includes enterprise file shares and applications 404. The connection between the cloud-based system 100 and on-premises connector 400 is dynamic, on-demand, and orchestrated by the cloud-based system 100. A key feature is its security at the edge—there is no need to punch any holes in the existing on-premises firewall. The connector 400 inside the enterprise (on-premises) "dials out" and connects to the cloud-based system 100 as if too were an endpoint. This on-demand dial-out capability and tunneling authenticated traffic back to the enterprise is a key differentiator for ZTNA. Also, this functionality can be implemented in part by an application 350 on the user device 300. Also, the applications 402, 404 can include B2B applications. Note, the difference between the applications 402, 404 is the applications 402 are hosted in the cloud, whereas the applications 404 are hosted on the enterprise network 410. The services described herein contemplates use with either or both of the applications 402, 404.

The paradigm of virtual private access systems and methods is to give users network access to get to an application and/or file share, not to the entire network. If a user is not authorized to get the application, the user should not be able even to see that it exists, much less access it. The virtual private access systems and methods provide an approach to deliver secure access by decoupling applications 402, 404 from the network, instead of providing access with a connector 400, in front of the applications 402, 404, an application on the user device 300, a central authority 152 to push policy, and the cloud-based system 100 to stitch the applications 402, 404 and the software connectors 400 together, on a per-user, per-application basis.

With the virtual private access, users can only see the specific applications 402, 404 allowed by the central authority 152. Everything else is "invisible" or "dark" to them. Because the virtual private access separates the application from the network, the physical location of the application 402, 404 becomes irrelevant-if applications 402, 404 are located in more than one place, the user is automatically directed to the instance that will give them the best performance. The virtual private access also dramatically reduces configuration complexity, such as policies/firewalls in the data centers. Enterprises can, for example, move applications to Amazon Web Services or Microsoft Azure, and take advantage of the elasticity of the cloud, making private, internal applications behave just like the marketing leading enterprise applications. Advantageously, there is no hardware to buy or deploy because the virtual private access is a service offering to end-users and enterprises.

§ 6.0 Digital Experience Monitoring

Figure 6:
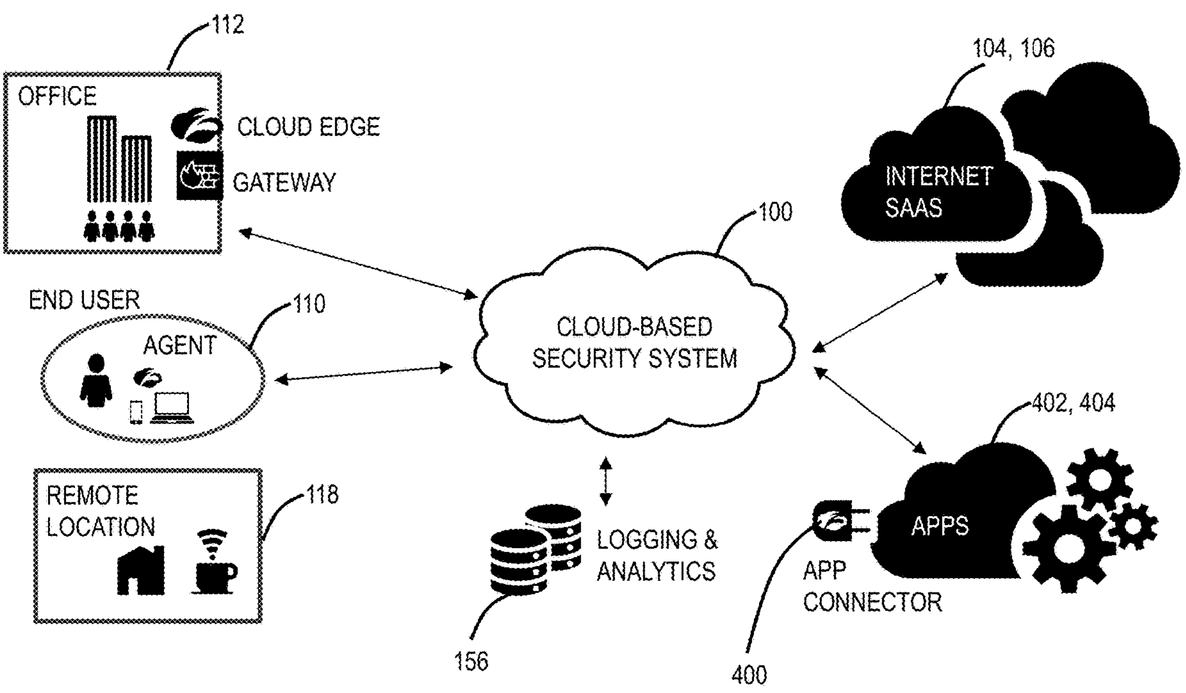
FIG. 6 is a network diagram of the cloud-based system in an application of digital experience monitoring.

FIG. 6 is a network diagram of the cloud-based system 100 in an application of digital experience monitoring. Here, the cloud-based system 100 providing security as a service as well as ZTNA, can also be used to provide real-time, continuous digital experience monitoring, as opposed to conventional approaches (synthetic probes). A key aspect of the architecture of the cloud-based system 100 is the inline monitoring. This means data is accessible in real-time for individual users from end-to-end. As described herein, digital experience monitoring can include monitoring, analyzing, and improving the digital user experience.

The cloud-based system 100 connects users 102 at the locations 110, 112, 118 to the applications 402, 404, the Internet 104, the cloud services 106, etc. The inline, end-to-end visibility of all users enables digital experience monitoring. The cloud-based system 100 can monitor, diagnose, generate alerts, and perform remedial actions with respect to network endpoints, network components, network links, etc. The network endpoints can include servers, virtual machines, containers, storage systems, or anything with an IP address, including the Internet of Things (IoT), cloud, and wireless endpoints. With these components, these network endpoints can be monitored directly in combination with a network perspective. Thus, the cloud-based system 100 provides a unique architecture that can enable digital experience monitoring, network application monitoring, infrastructure component interactions, etc. Of note, these various monitoring aspects require no additional components—the cloud-based system 100 leverages the existing infrastructure to provide this service.

Again, digital experience monitoring includes the capture of data about how end-to-end application availability, latency, and quality appear to the end user from a network perspective. This is limited to the network traffic visibility and not within components, such as what application performance monitoring can accomplish. Networked application monitoring provides the speed and overall quality of networked application delivery to the user in support of key business activities. Infrastructure component interactions include a focus on infrastructure components as they interact via the network, as well as the network delivery of services or applications. This includes the ability to provide network path analytics.

The cloud-based system 100 can enable real-time performance and behaviors for troubleshooting in the current state of the environment, historical performance and behaviors to understand what occurred or what is trending over time, predictive behaviors by leveraging analytics technologies to distill and create actionable items from the large dataset collected across the various data sources, and the like. The cloud-based system 100 includes the ability to directly ingest any of the following data sources network device-generated health data, network device-generated traffic data, including flow-based data sources inclusive of NetFlow and IPFIX, raw network packet analysis to identify application types and performance characteristics, HTTP request metrics, etc. The cloud-based system 100 can operate at 10 gigabits (10G) Ethernet and higher at full line rate and support a rate of 100,000 or more flows per second or higher.

The applications 402, 404 can include enterprise applications, Office 365, Salesforce, Skype, Google apps, internal applications, etc. These are critical business applications where user experience is important. The objective here is to collect various data points so that user experience can be quantified for a particular user, at a particular time, for purposes of analyzing the experience as well as improving the experience. In an embodiment, the monitored data can be from different categories, including application-related, network-related, device-related (also can be referred to as endpoint-related), protocol-related, etc. Data can be collected at the application 350 or the cloud edge to quantify user experience for specific applications, i.e., the application-related and device-related data. The cloud-based system 100 can further collect the network-related and the protocol-related data (e.g., Domain Name System (DNS) response time).

Application-Related Data

| | |
|---|---|
| Page Load Time | Redirect count (#) |
| Page Response Time | Throughput (bps) |
| Document Object Model (DOM) Load Time | Total size (bytes) |
| Total Downloaded bytes | Page error count (#) |
| App availability (%) | Page element count by category (#) |

Network-Related Data

| | |
|---|---|
| HTTP Request metrics | Bandwidth |
| Server response time | Jitter |
| Ping packet loss (%) | Trace Route |
| Ping round trip | DNS lookup trace |
| Packet loss (%) | GRE/IPSec tunnel monitoring |
| Latency | MTU and bandwidth measurements |

Device-Related Data (Endpoint-Related Data)

| | |
|---|---|
| System details | Network (config) |
| Central Processing Unit (CPU) | Disk |
| Memory (RAM) | Processes |
| Network (interfaces) | Applications |

Metrics could be combined. For example, device health can be based on a combination of CPU, memory, etc. Network health could be a combination of Wi-Fi/LAN connection health, latency, etc. Application health could be a combination of response time, page loads, etc. The cloud-based system 100 can generate service health as a combination of CPU, memory, and the load time of the service while processing a user's request. The network health could be based on the number of network path(s), latency, packet loss, etc.

The lightweight connector 400 can also generate similar metrics for the applications 402, 404. In an embodiment, the metrics can be collected while a user is accessing specific applications that user experience is desired for monitoring. In another embodiment, the metrics can be enriched by triggering synthetic measurements in the context of an inline transaction by the application 350 or cloud edge. The metrics can be tagged with metadata (user, time, app, etc.) and sent to a logging and analytics service for aggregation, analysis, and reporting. Further, network administrators can get UEX reports from the cloud-based system 100. Due to the inline nature and the fact the cloud-based system 100 is an overlay (in-between users and services/applications), the cloud-based system 100 enables the ability to capture user experience metric data continuously and to log such data historically. As such, a network administrator can have a long-term detailed view of the network and associated user experience.

Policy Based Authentication for PRA Systems

The present disclosure provides systems and methods for seamless authentication into PRA systems protected through Zero Trust Private Access (ZTPA). PRA systems can include systems such as Windows, Unix, Mac machines, etc. Various methods can automatically select the most optimal authentication method and materials through zero trust policies. These zero trust policies can be preconfigured for specific users, groups of users, tenants, etc. to provide end users with tailored authorization, while protecting credentials as a category of protected resources in private access systems such as ZPA.

Again, the main problem with traditional approaches is that user credentials and methods of authentication are at risk due to the use of third party authentication services. This disclosure provides methods for protecting such methods, credentials, and other secret materials used to authenticate into PRA systems. These proposed methods are performed in full compliance with zero trust methodology and practice as described herein. These protected credentials are matched with the PRA request, and subsequent authentication attempts, through zero trust policy configured with an arbitrary number of criterium expressions.

Expressions can be utilized for pinpointing the identity of the request issuer (user) to a stored and protected credential. The credential can be used to seamlessly provide authentication into the PRA system without the end user being required to do anything. The protected credentials can be protected by ZPA or other private access systems. This mechanism can then be used to fine tune what a given identity can do, or not do, on the PRA system once authenticated.

Various embodiments use a plurality of criteria in order to identify which credentials to use for the seamless authentication into specific PRA systems. These criteria can include Security Assertion Markup Language (SAML) attributes, client posture, end user network, etc. In an example, a user utilizing a trusted network can be assigned a credential that gives them more accessibility than a user using an untrusted network in the specific PRA system. With this said, users coming from an untrusted network can be given credentials that significantly limit what can be done on the specific PRA system. Additionally, such a session can be observed more closely by systems in the zero trust network (cloud-based system). Various policies that govern how the credentials are assigned can be managed by administrators associated with a tenant, user, group of users, etc.

Figure 7:
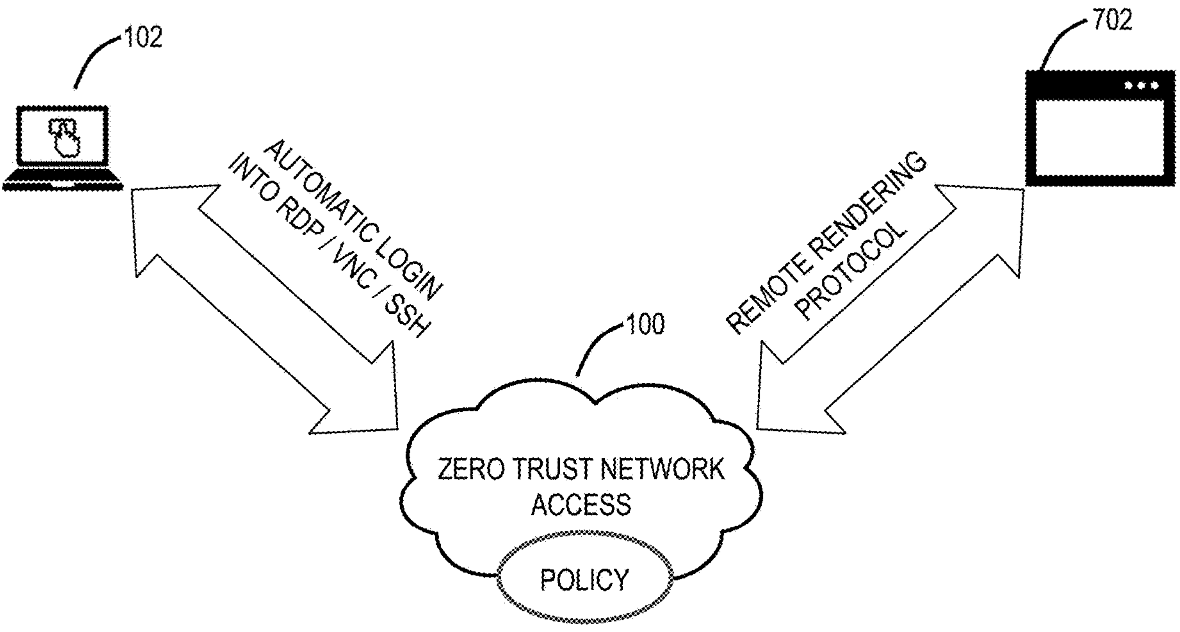
FIG. 7 is a diagram of the cloud-based system 100 adapted to provide policy based authentication for Privileged Remote Access (PRA) systems.

FIG. 7 is a diagram of the cloud-based system 100 adapted to provide policy based authentication for PRA systems. The cloud-based system 100 is adapted to provide zero trust network access and perform the methods described herein. A user 102 can request to access any of a plurality of PRA systems 702. This triggers the present methods for policy based authentication via the cloud-based system 100. The various criteria which are utilized to identify which credentials to use can be defined by the policy, which can be preconfigured by administrators. Thus, an administrator can be enabled to configure credentials via policy to enable the sign-on processes herein.

In various embodiments, an administrator is able to configure credentials that can be mapped and injected into a Remote Desktop Protocol (RDP), Secure Shell (SSH), and Virtual Network Computing (VNC) session without requiring the end user to enter any credentials.

Exporters can evaluate policies for credential mapping, these policies being applicable to privileged consoles. This is different than access policies as they are not applicable to an entire application segment. For example, an application segment can have a plurality of types of consoles (RDP, SSH, VNC, etc.) where each of them can have a separate credential map policy. In an embodiment, various criteria which are applicable to credential mapping and file transfer policies can be SAML and System for Cross-Domain Identity Management (SCIM) attributes.

In order to support the evaluation of policies, various embodiments can utilize different options. These options include refactoring policy engines on brokers and breaking them into libraries. Customer managers and policy evaluators can be used by both the associated exporter and the associated broker. In order to accommodate differences in access policies, credential mapping, and file transfer policies, a policy builder library can be updated. Another option can include adding new policy engines on exporters which are based on broker policy code. Other options can include extending the policy engine framework to support the new policy.

In various embodiments, when a user selects a console in a PRS portal, the browser is adapted to send a request for console information to the exporter. The console information includes the name and type of console selected. When the exporter receives the request, it calls to trigger the policy evaluation code. The response structure can be modified to let a Use Interface (UI) know if interactive authorization dialogue needs to be triggered. The exporter can further check if there are any credential rules that apply to the selected console. If so, the rules are evaluated in order by the policy framework. In an embodiment, the first applicable console credential rule will be utilized. The credential (i.e., username/password, SSH key, password credential, etc.) mapped to the rule is retrieved and decryption of the credential can be done using a crypto service. If there is no credential mapped for the user and/or console, an interactive credential retrieval window is opened, where the user is instructed to input credentials. This can be achieved by sending an additional parameter to the browser.

Figure 8:
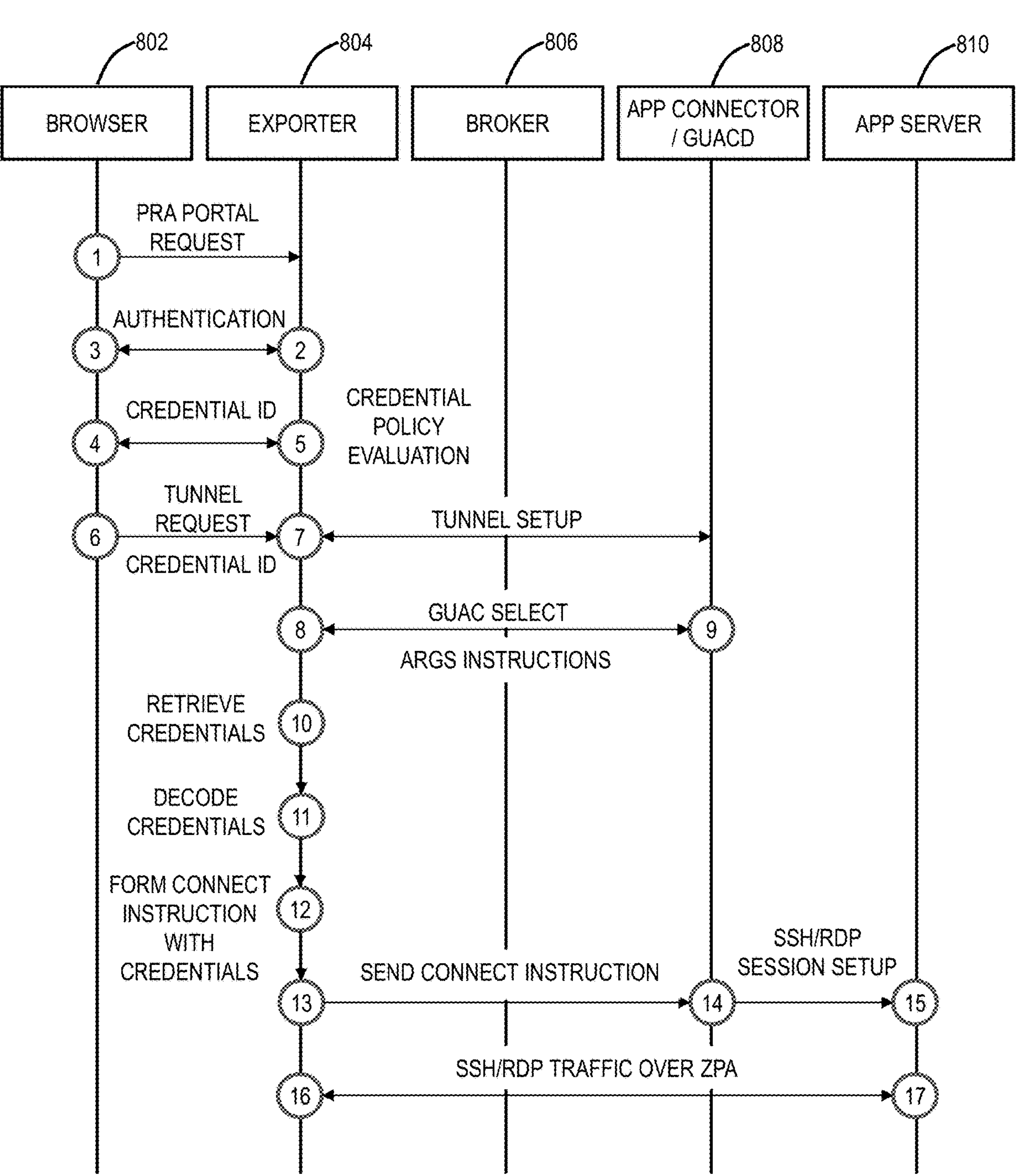
FIG. 8 is a flow diagram for a new credential mapping workflow.

FIG. 8 is a flow diagram for a new credential mapping workflow. The flow diagram shows steps for credential mapping (steps 1-17) where the steps start by a browser 802 sending a Privileged Remote Access (PRA) portal request to an exporter 804. An authentication step takes place by allowing a user to provide credentials such as a password and username. Credential policy is evaluated, and a tunnel request is sent to the exporter 804. A tunnel is set up between the exporter 804 and the application connector 808. The exporter retrieves credentials, decodes the credentials, and forms connect instructions with the credentials. The decoding can include decryption using one or more crypto services. Connect instructions are then sent to the application connector 808, and the SSH or RDP session is set up. Traffic associated with the session, between the exporter 804 and the application server 810, is then handled by private access systems (i.e., ZPA).

It will be appreciated that the application server 810 can be a server associated with any PRA system. Additionally, the steps shown in FIG. 8 present an example, where any of the steps can be interchanged and/or removed for various embodiments.

Sensitive information such as passwords, private keys, etc. are not stored in plain text anywhere in the systems in order to avoid exposure which can result in malicious activities. Various embodiments store passwords and private keys in encrypted form in database tables. When the information is needed, it is decrypted and stored in memory for a finite amount of time, such as 1 second. In various embodiments, to cater encryption and decryption needs, one or more crypto services are used. On a management API side, passwords and private keys are encrypted using crypto store services and encrypted values are saved in database tables. In an example, when the information is needed, the information is decrypted and aged out of memory after 1 second.

Policy engines can be extended to add a new policy type for credential mapping. In these examples, no change to access policies are made, thus existing policy evaluation rules based on types (timeout, inspection, isolation, etc.) are not affected.

FIG. 9 is a screenshot of a User Interface (UI) for configuring privileged credentials. In various embodiments, the UI can be utilized to configure privileged credentials and privileged credential policy. The UI can show a list of credentials having fields including name, type, username, last update, and actions. The list can be filterable based on one or more of the fields.

Figure 10:
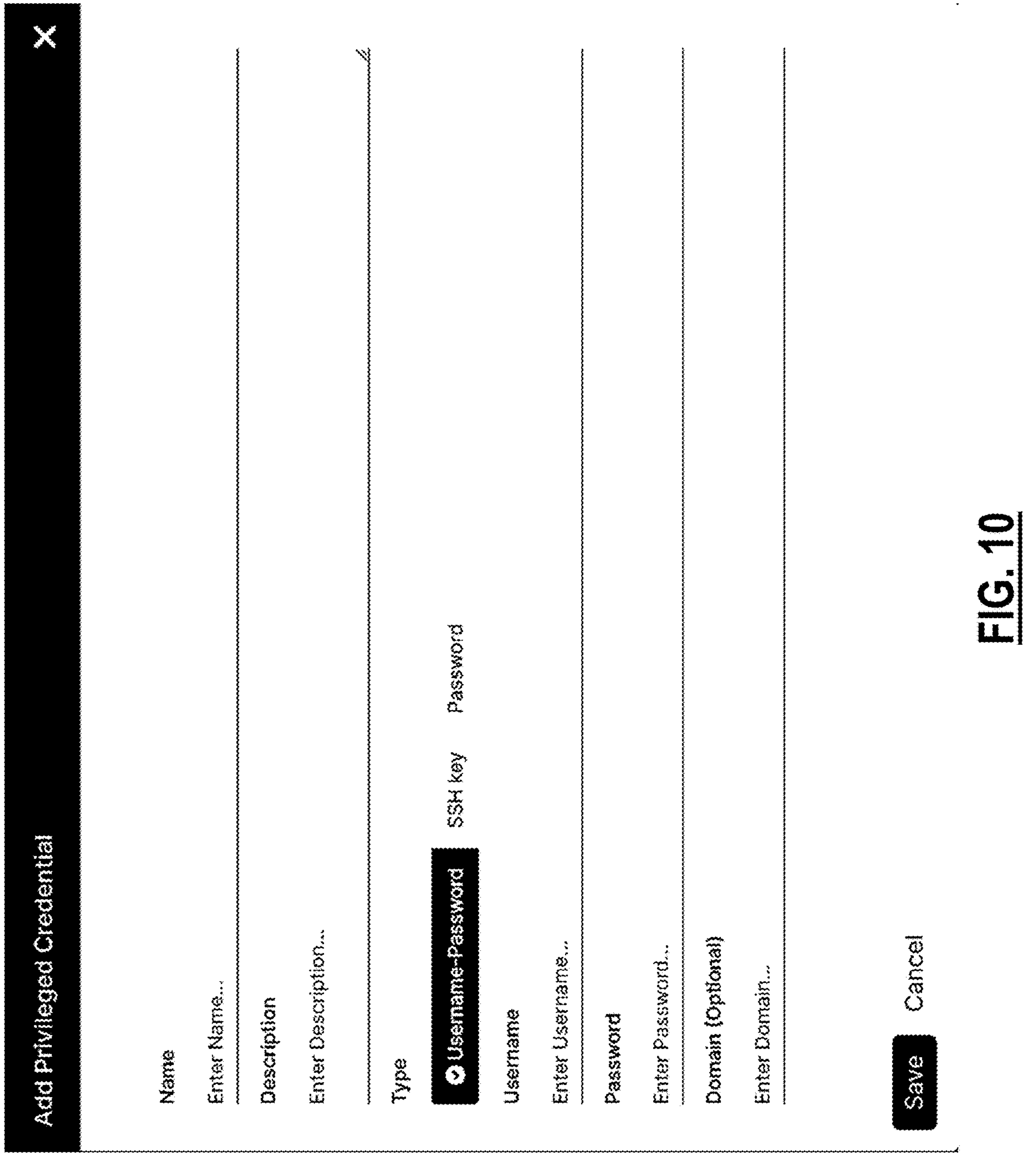
FIG. 10 is a screenshot of a UI for adding privileged credentials.

FIG. 10 is a screenshot of a UI for adding privileged credentials. A user is able to add privileged credentials via the window shown in FIG. 10. The window displays input fields for name, description, type, username, password, and domain. The various types include username-password, SSH key, and password. When selected, the username-password type displays a username and password input field (for RDP connection). Selecting the SSH type displays the username input field and private key text area field (for SSH connection). Finally, when selected, the password type will display only a password input field (for VNC connections). Once the privileged credential is created, the user (administrator) cannot view the password and private key fields. However, the user can edit the credential, and update the password or private key.

FIG. 11 is a screenshot of a window for configuring privileged credential policy. The window can show a list of all privileged credentials mapped to privileged consoles along with the rules associated with the configured policy. This includes displaying a rule order. The list of privileged credentials can include fields of rule order, name, consoles, credentials, and actions. again, this list can be filterable based on the various fields and also based on SAML attribute names.

Figure 12:
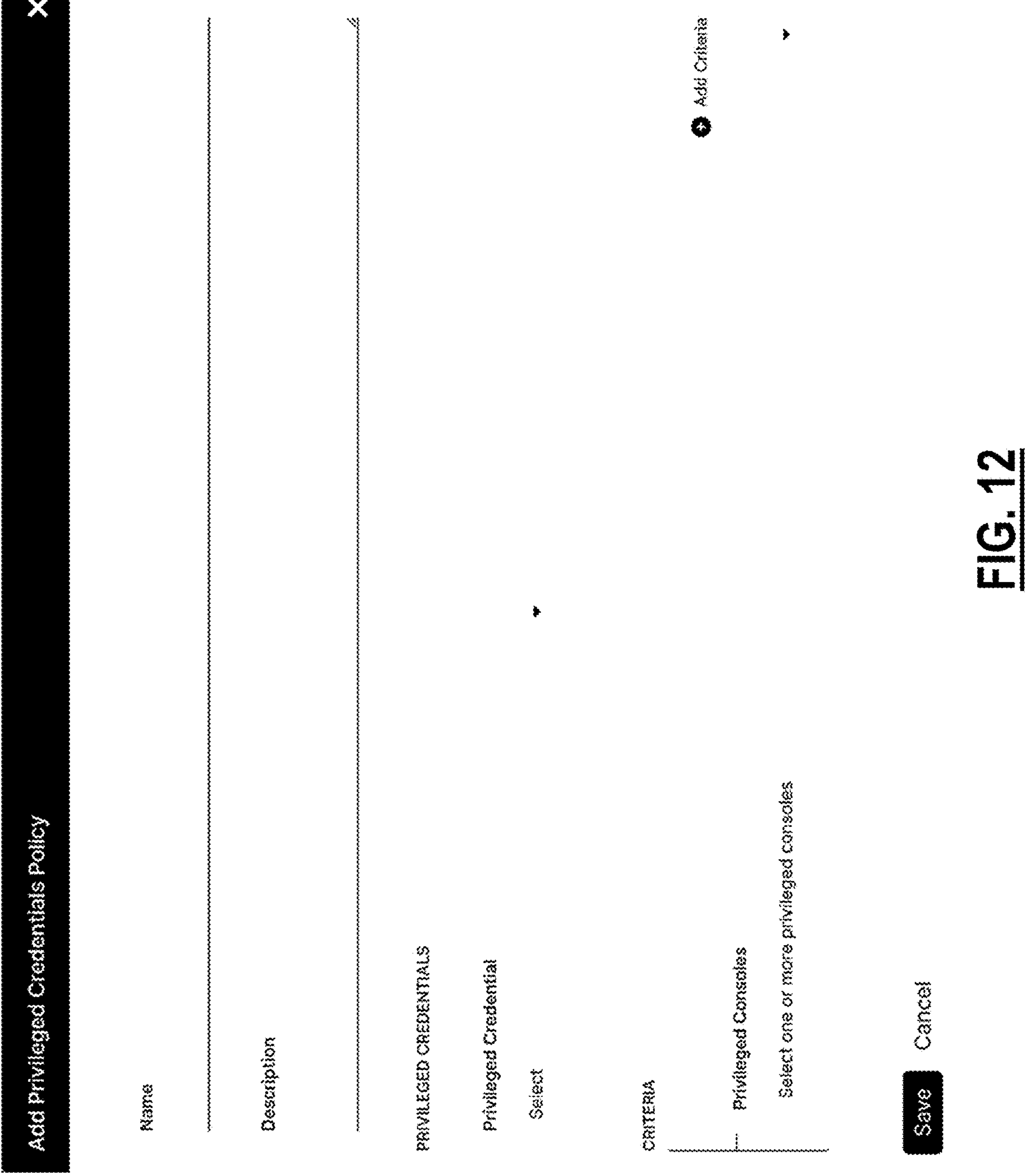
FIG. 12 is a screenshot of a window for adding a new rule.
Figure 13:
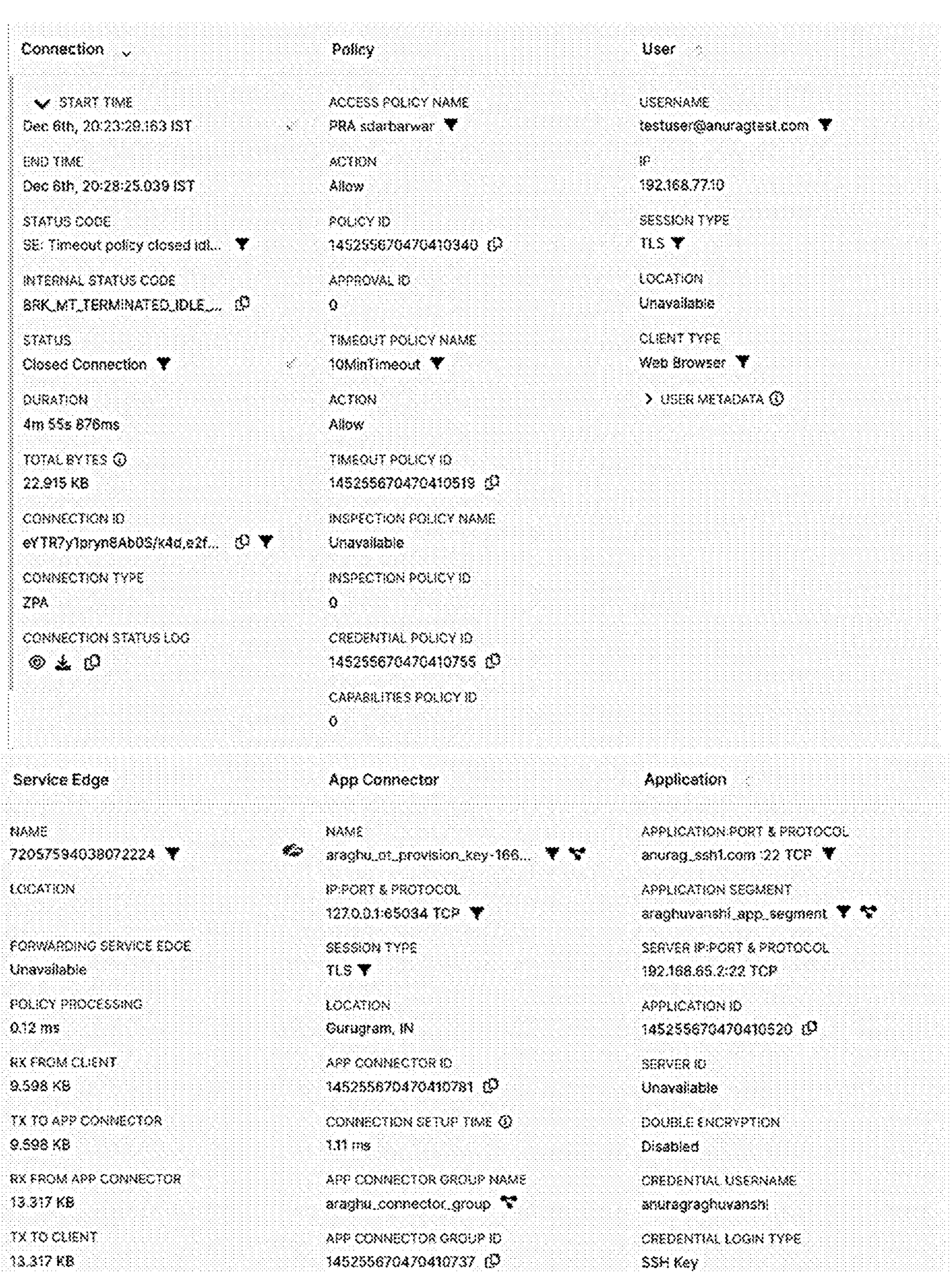
FIG. 13 is a screenshot of a window displaying diagnostic logs.

FIG. 12 is a screenshot of a window for adding a new rule. When a user selects to add a rule, the UI can present a modal window with inputs for various fields. These fields can include name, description, connection type (RDP, SSH, VNC, etc.), a multi-selectable dropdown listing all of the privileged consoles, and a criteria selector. In various embodiments, privileged consoles and credentials can be filtered and displayed based on the connection type selected. Various changes made through the UI can be tracked and reviewed through diagnostic logs. FIG. 13 is a screenshot of a window displaying diagnostic logs. The diagnostic logs can show credential usernames, credential policy IDs, error strings (i.e., privileged remote access error strings), etc. The error strings can be based on status codes received from various remote rendering protocols on application connectors. For example, error strings can be based on status codes received from Guacd (Guacamole protocol) on an application connector.

In various embodiments, APIs expect credential payloads to be sent in an unencrypted form. Encrypted credentials can be fetched and stored in a database. These encrypted credentials are not sent in any API response. Alternatively, an exporter will fetch the encrypted credentials from the database and use a crypto service to decrypt the credentials for credential mapping. APIs are adapted to get all console credentials from a provided customer ID and provide the results of stored credentials, retrieve stored credential objects by ID, delete the stored credentials by ID, create new credential objects, and update existing credential objects by ID.

Again, credential policy can be introduced as a new policy type. Various credential rules can map credentials and connection type with the appropriate credential policy. APIs can further be configured to perform operations on credentials including retrieving all credential rules for a provided customer ID, deleting credential rules by ID, creating new credential rule objects, and updating existing credential rule objects by ID.

Process for Policy Based Authentication for PRA Systems

Figure 14:
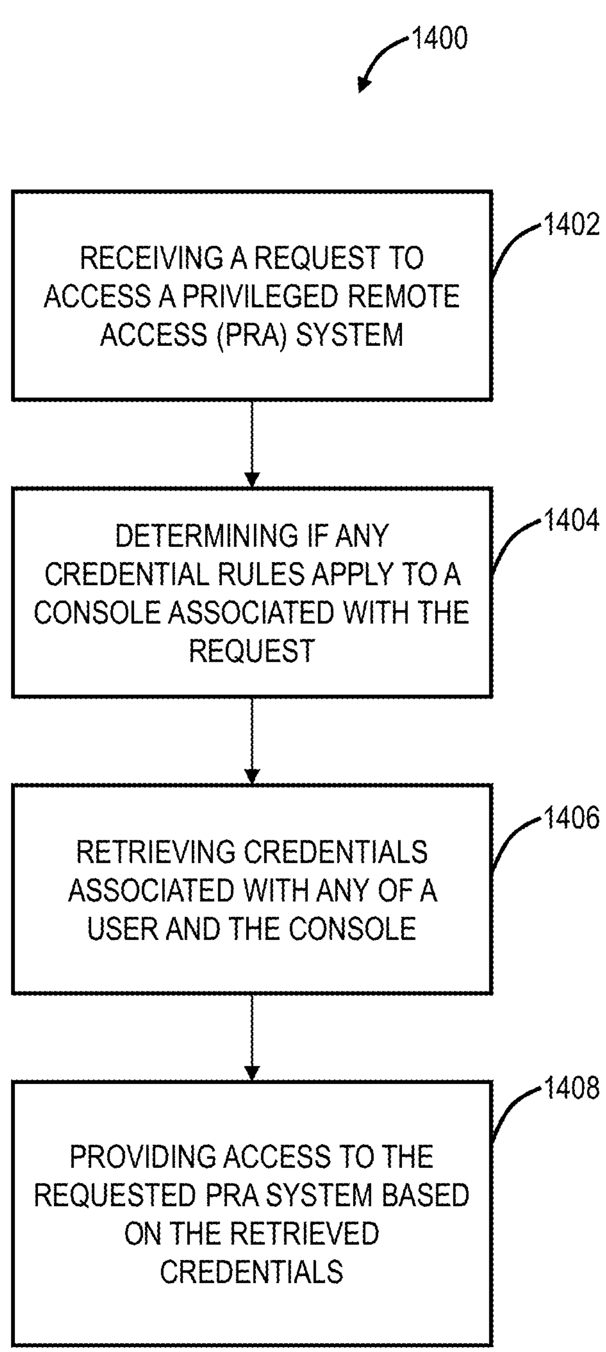
FIG. 14 is a flowchart of a process for policy based authentication for PRA systems.

FIG. 14 is a flowchart of a process 1400 for policy based authentication for PRA systems. The process 1400 includes steps of receiving a request to access a Privileged Remote Access (PRA) system (step 1402); determining if any credential rules apply to a console associated with the request (step 1404); retrieving credentials associated with any of a user and the console from a database, thereby avoiding the user being required to provide credentials (step 1406); and providing access to the requested PRA system based on the retrieved credentials (step 1408).

The process 1400 can further include wherein the credentials are retrieved based on matching credentials with the request, wherein preconfigured policy is utilized for matching an identity of the user issuing the request to a stored credential. The database can include credentials stored in an encrypted form, wherein the steps can further include decrypting the credentials after the retrieving. The decrypting can be performed through one or more crypto services. Decrypted credentials are stored in memory for a finite amount of time. Credentials can be retrieved based on a plurality of criteria including any of Security Assertion Markup Language (SAML) attributes, client posture, and end user network. Responsive to no credentials being found, the steps can further include providing an interactive credential retrieving window; and instructing the user to provide credentials via the interactive credential retrieving window.

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections include headers for various embodiments and those skilled in the art will appreciate these various embodiments may be used in combination with one another as well as individually.

What is claimed is:

1. A method comprising steps of:

receiving a request to access a Privileged Remote Access (PRA) system protected through a cloud-based system, wherein the request identifies a privileged console selected via a PRA portal and includes console information including a console name and a console type;

determining if any policy-based credential rules, preconfigured by an administrator, apply to a console associated with the request, wherein determining comprises, by an exporter of the cloud-based system, evaluating a credential mapping policy applicable to privileged consoles and different from an access policy applicable to an application segment, the credential mapping policy including an ordered set of rules that are evaluated in order to select a first applicable rule;

retrieving credentials associated with any of a user and the console from a database, thereby avoiding the user being required to provide credentials, wherein retrieving comprises retrieving, from the database, an encrypted privileged credential mapped to the first applicable rule, the encrypted privileged credential comprising any of (i) a username and password, (ii) a password, or (iii) a private key for authentication into the PRA system, and wherein the encrypted privileged credential is not sent in any API response to a user device and is not provided to a user;

decrypting the credentials using one or more crypto services and storing the decrypted credentials in memory for only a finite time in volatile memory and aging out the decrypted credentials from the volatile memory after the finite time; and authenticating the request to access the PRA system and providing access to the requested PRA system based on the retrieved credentials, without requiring a user input, including injecting the retrieved credentials into a privileged session of the console, the privileged session comprising any of a Remote Desktop Protocol (RDP), Secure Shell (SSH), or Virtual Network Computing (VNC) session, further comprising forming connect instructions that include the decrypted credentials and sending the connect instructions from the exporter to an application connector, and wherein providing access comprises establishing, by the application connector using the connect instructions, the privileged session to the PRA system without requiring user input of the decrypted credentials.

2. The method of claim 1, wherein the credentials are retrieved based on matching credentials with the request, wherein preconfigured policy is configured by an administrator and is utilized for matching an identity of the user issuing the request to a stored credential.

3. The method of claim 1, wherein the database includes credentials stored in an encrypted form in database tables, and wherein the steps further include decrypting the credentials after the retrieving.

4. The method of claim 1, wherein credentials are retrieved based on a plurality of criteria including any of Security Assertion Markup Language (SAML) attributes, client posture, and end user network.

5. The method of claim 1, wherein responsive to no credentials being found, the steps further comprise:

providing an interactive credential retrieving window; and instructing the user to provide credentials via the interactive credential retrieving window.

6. A non-transitory computer-readable medium comprising instructions that, when executed, cause one or more processors to perform steps of:

receiving a request to access a Privileged Remote Access (PRA) system protected through a cloud-based system, wherein the request identifies a privileged console selected via a PRA portal and includes console information including a console name and a console type;

determining if any policy-based credential rules, preconfigured by an administrator, apply to a console associated with the request, wherein determining comprises, by an exporter of the cloud-based system, evaluating a credential mapping policy applicable to privileged consoles and different from an access policy applicable to an application segment, the credential mapping policy including an ordered set of rules that are evaluated in order to select a first applicable rule;

retrieving credentials associated with any of a user and the console from a database, thereby avoiding the user being required to provide credentials, wherein retrieving comprises retrieving, from the database, an encrypted privileged credential mapped to the first applicable rule, the encrypted privileged credential comprising any of (i) a username and password, (ii) a password, or (iii) a private key for authentication into the PRA system, and wherein the encrypted privileged credential is not sent in any API response to a user device and is not provided to a user;

decrypting the credentials using one or more crypto services and storing the decrypted credentials in memory for only a finite time in volatile memory and aging out the decrypted credentials from the volatile memory after the finite time; and authenticating the request to access the PRA system and providing access to the requested PRA system based on the retrieved credentials, without requiring a user input, including injecting the retrieved credentials into a privileged session of the console, the privileged session comprising any of a Remote Desktop Protocol (RDP), Secure Shell (SSH), or Virtual Network Computing (VNC) session, further comprising forming connect instructions that include the decrypted credentials and sending the connect instructions from the exporter to an application connector, and wherein providing access comprises establishing, by the application connector using the connect instructions, the privileged session to the PRA system without requiring user input of the decrypted credentials.

7. The non-transitory computer-readable medium of claim 6, wherein the credentials are retrieved based on matching credentials with the request, wherein preconfigured policy is utilized for matching an identity of the user issuing the request to a stored credential.

8. The non-transitory computer-readable medium of claim 6, wherein the database includes credentials stored in an encrypted form, and wherein the steps further include decrypting the credentials after the retrieving.

9. The non-transitory computer-readable medium of claim 6, wherein credentials are retrieved based on a plurality of criteria including any of Security Assertion Markup Language (SAML) attributes, client posture, and end user network.

10. The non-transitory computer-readable medium of claim 6, wherein responsive to no credentials being found, the steps further comprise:

providing an interactive credential retrieving window; and instructing the user to provide credentials via the interactive credential retrieving window.

11. A cloud-based system comprising:

one or more processors and memory storing instructions that, when executed, cause the one or more processors to:

receive a request to access a Privileged Remote Access (PRA) system protected through the cloud-based system, wherein the request identifies a privileged console selected via a PRA portal and includes console information including a console name and a console type;

determine if any policy-based credential rules, preconfigured by an administrator, apply to a console associated with the request, wherein determining comprises, by an exporter of the cloud-based system, evaluating a credential mapping policy applicable to privileged consoles and different from an access policy applicable to an application segment, the credential mapping policy including an ordered set of rules that are evaluated in order to select a first applicable rule;

retrieve credentials associated with any of a user and the console from a database, thereby avoiding the user being required to provide credentials, wherein retrieving comprises retrieving, from the database, an encrypted privileged credential mapped to the first applicable rule, the encrypted privileged credential comprising any of (i) a username and password, (ii) a password, or (iii) a private key for authentication into the PRA system, and wherein the encrypted privileged credential is not sent in any API response to a user device and is not provided to a user;

decrypting the credentials using one or more crypto services and storing the decrypted credentials in memory for only a finite time in volatile memory and aging out the decrypted credentials from the volatile memory after the finite time; and authenticate the request to access the PRA system and provide access to the requested PRA system based on the retrieved credentials, without requiring a user input, including injecting the retrieved credentials into a privileged session of the console, the privileged session comprising any of a Remote Desktop Protocol (RDP), Secure Shell (SSH), or Virtual Network Computing (VNC) session, further comprising forming connect instructions that include the decrypted credentials and sending the connect instructions from the exporter to an application connector, and wherein providing access comprises establishing, by the application connector using the connect instructions, the privileged session to the PRA system without requiring user input of the decrypted credentials.

12. The cloud-based system of claim 11, wherein the credentials are retrieved based on matching credentials with the request, wherein preconfigured policy is utilized for matching an identity of the user issuing the request to a stored credential.

13. The cloud-based system of claim 11, wherein the database includes credentials stored in an encrypted form, and wherein the instructions further cause the one or more processors to decrypt the credentials after the retrieving.

14. The cloud-based system of claim 11, wherein credentials are retrieved based on a plurality of criteria including any of Security Assertion Markup Language (SAML) attributes, client posture, and end user network.

15. The cloud-based system of claim 11, wherein responsive to no credentials being found, the instructions further cause the one or more processors to:

provide an interactive credential retrieving window; and instruct the user to provide credentials via the interactive credential retrieving window.

* * * * *